(12) United States Patent
Fishel et al.

(10) Patent No.: US 12,554,645 B1
(45) Date of Patent: Feb. 17, 2026

(54) SYSTEMS AND METHODS FOR PRIORITY-AWARE CACHE REPLACEMENT

(71) Applicant: Google LLC, Mountain View, CA (US)

(72) Inventors: Liran Fishel, Ra'Anana (IL); David Dayan, Kfar Vitkin (IL)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/625,452

(22) Filed: Apr. 3, 2024

(51) Int. Cl.
*G06F 12/084* (2016.01)
*G06F 12/123* (2016.01)
*G06F 12/126* (2016.01)

(52) U.S. Cl.
CPC .......... *G06F 12/084* (2013.01); *G06F 12/123* (2013.01); *G06F 12/126* (2013.01)

(58) Field of Classification Search
CPC ..... G06F 12/084; G06F 12/123; G06F 12/126
See application file for complete search history.

(56) References Cited

U.S. PATENT DOCUMENTS

| | | | | |
|---|---|---|---|---|
| 6,629,207 B1 * | 9/2003 | Yoshioka | .............. | G06F 12/126 711/E12.075 |
| 9,168,012 B2 | 10/2015 | Hart et al. | | |
| 2007/0094450 A1 * | 4/2007 | VanderWiel | .......... | G06F 12/128 711/122 |
| 2008/0010415 A1 * | 1/2008 | Sawdey | ................ | G06F 12/123 711/E12.072 |
| 2008/0235456 A1 * | 9/2008 | Kornegay | ............. | G06F 12/121 711/130 |
| 2017/0024327 A1 * | 1/2017 | Saidi | ..................... | G06F 12/128 |
| 2019/0073305 A1 * | 3/2019 | Hijaz | .................... | G06F 12/128 |

* cited by examiner

*Primary Examiner* — Aracelis Ruiz
(74) *Attorney, Agent, or Firm* — Lerner David LLP

(57) ABSTRACT

The disclosure provides for improved systems and methods for operating a shared cache among multiple workloads that have different levels of priority. For example, a plurality of processor cores can have access to a shared system cache, and these processor cores can be configured to execute different workloads in parallel with one another. Moreover, some workloads may be designated as having a higher priority than other workloads, and the shared cache can be configured to maintain cached data in a manner that can allow data associated with higher priority workloads to remain within the shared cache for a longer period of time than data for lower priority workloads. In accordance with aspects of the disclosure, a shared cache may implement an altered least-recently-used (LRU) replacement policy in which cache lines of data are positioned within a replacement queue based on the priority level of the data that is being stored.

20 Claims, 6 Drawing Sheets

SYSTEMS AND METHODS FOR PRIORITY-AWARE CACHE REPLACEMENT

BACKGROUND

High-speed processing devices can rely on cached data in order to quickly access data in connection with executing a workload. In particular, a cache can receive read and write operations from a processor that will cause the cache to store and update the data that is located within the cache. In performing these operations, the cache will eventually need to replace some of the cached data with new data that has been received. In order to determine what data is to be replaced, a cache can implement a least-recently-used replacement policy, in which the least recently used data within the cache is replaced with new data. However, current caches are not configured in a manner that is conducive for operating as a shared cache among multiple workloads.

BRIEF SUMMARY

What is needed are improved systems and methods for operating a shared cache among multiple workloads that have different levels of priority. In accordance with aspects of the disclosure, a plurality of processor cores can have access to a shared system cache, and these processor cores can be configured to execute different workloads in parallel with one another. Moreover, some workloads may be designated as having a higher priority than other workloads, and the shared cache can be configured to maintain cached data in a manner that can allow data associated with higher priority workloads to remain within the shared cache for a longer period of time than data for lower priority workloads. In accordance with aspects of the disclosure, a shared cache may implement an altered least-recently-used (LRU) replacement policy in which cache lines of data are positioned within a replacement queue based on the priority level of the data that is being stored.

In accordance with aspects of the disclosure, a system for maintaining a data cache may include, one or more processors configured to execute in parallel a plurality of workloads; a shared cache that is accessible for operations associated with the plurality of workloads, the shared cache containing a plurality of cache lines configured for storing cached data, wherein each cache line may be associated with one of a plurality of priority levels; and wherein the shared cache is configured to place a touched cache line within an altered least-recently-used (LRU) queue based on an identified priority of the touched cache line.

In accordance with other aspects of the disclosure, the plurality of cache lines may be associated with priority levels based on being associated with particular workloads from the plurality of workloads. In addition, the one or more processors may be a plurality of processor cores configured to access the shared cache while executing the plurality of workloads in parallel.

In accordance with still other aspects of the disclosure, the touched cache line may be placed in front of one or more other cache lines within the altered LRU queue based on the identified priority being less than the priority levels of the one or more other cache lines.

In accordance with yet other aspects of the disclosure, the touched cache line may be a new cache line to be added to the shared cache at a priority-based queue position, and the shared cache may be further configured to identify an existing cache line to be replaced by the new cache line based on the existing cache line being designated with a queue position for eviction.

In accordance with other aspects of the disclosure, a lookup table may be configured to identify a queue position for the touched cache line based on the identified priority of the touched cache line.

In accordance with still other aspects of the disclosure, the shared cache may be configured to place a plurality of touched cache lines within the altered LRU queue, with a first subset of the touched cache lines being placed within the altered LRU queue based on identified priorities of the touched cache lines and a second subset being placed independent of priority levels. In addition, the second subset of touched cache lines may be placed at the end of the altered LRU queue based on an output of a random number generator or a pseudo-random number generator.

In accordance with yet other aspects of the disclosure, the shared cache may be further configured to prevent one or more cache lines from the plurality of cache lines from being replaced in connection with adding new cache lines to the shared cache.

In accordance with still other aspects of the disclosure, the shared cache may be configured as a static random-access memory (SRAM).

In accordance with other aspects of the disclosure, a method for maintaining a data cache may include storing data within a plurality of cache lines of a shared cache, wherein the shared cache is configured to be accessible in connection with executing a plurality of parallel workloads; receiving, by the shared cache, a request in connection with one of the plurality of parallel workloads; accessing a data set in connection with the request; determining a priority level of the data set; placing the data set in an altered least-recently-used (LRU) queue within the shared cache based on the priority level of the data set.

In accordance with yet other aspects of the disclosure, the priority level of the data set may be based on a type of workload that has performed operations in connection with the data set. In addition, the method may include receiving a plurality of requests from a plurality of processor cores in connection with executing the plurality of parallel workloads.

In accordance with still other aspects of the disclosure, the method may further include placing the data set within the altered LRU queue in front of one or more stored cache lines based on the priority level of the data set being less than priority levels of the one or more stored cache lines.

In accordance with other aspects of the disclosure, the data set may be added to the shared cache, and the method may further include identifying an existing cache line to be replaced by the data set based on the existing cache line being designated with a queue position for eviction; and adding the data set as a new cache line at a priority-based queue position within the altered LRU queue.

In accordance with still other aspects of the disclosure, the method may include accessing a lookup table configured to identify a queue position for the data set based on the identified priority of the data set.

In accordance with yet other aspects of the disclosure, the method may include placing a first subset of data within the altered LRU queue based on identified priority levels of the first subset of data and placing a second subset of data within the altered LRU queue independent of priority levels. In addition, the second subset of data may be placed at the end of the altered LRU queue based on an output of a random number generator or a pseudo-random number generator.

The method may also include identifying one or more cache lines from the plurality of cache lines as being locked from being replaced in connection with adding new cache lines to the shared cache.

DETAILED DESCRIPTION

Figure 1:
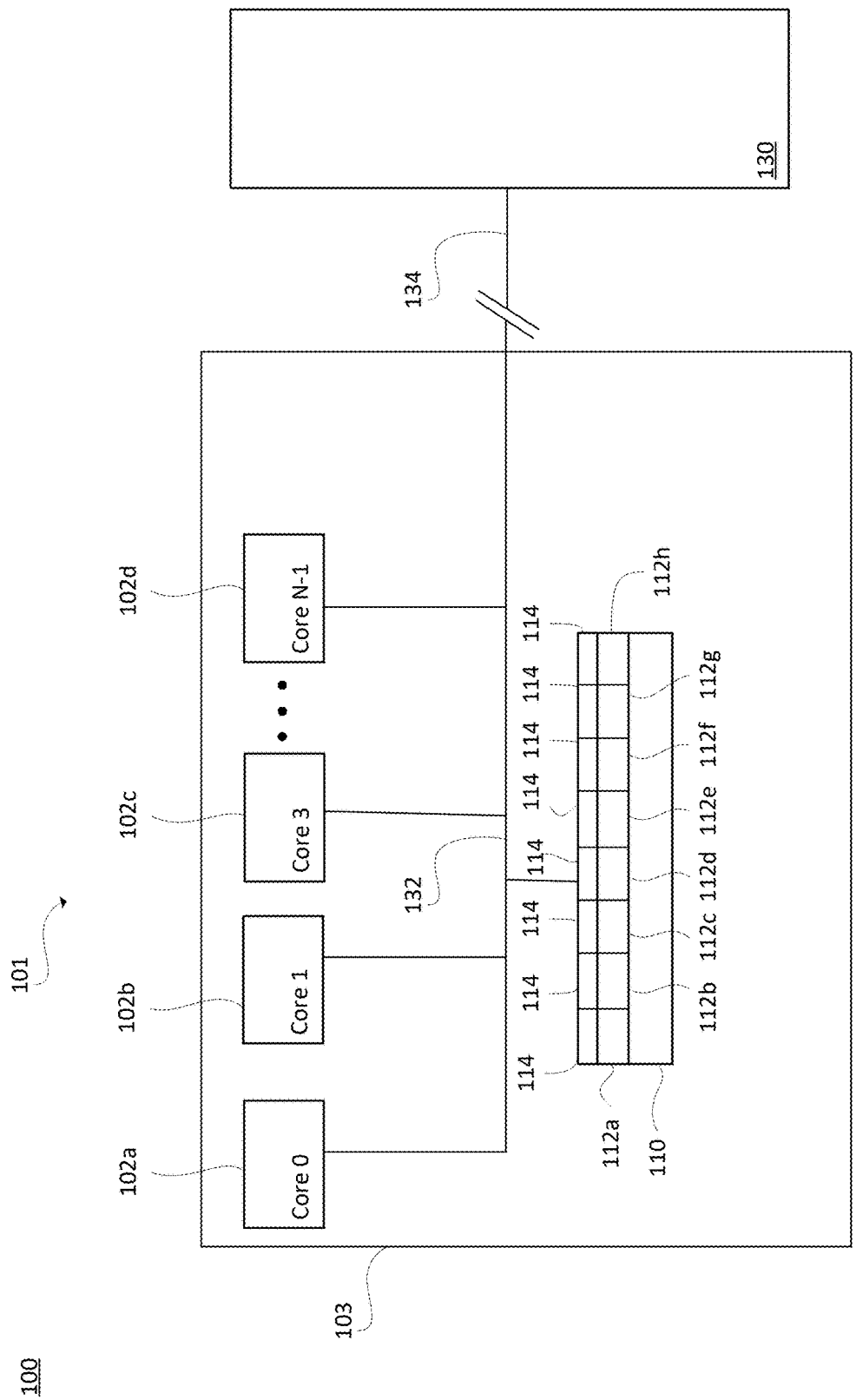
FIG. 1 is a block diagram of a shared system cache in accordance with aspects of the disclosure.

The systems and methods disclosed herein may be used in connection with a cache that is shared with a plurality of processing cores. For example, FIG. 1 is a block diagram 100 of a system 101 having an N number of processor cores, including processor cores 102*a-d*, a shared cache 120, as well as a memory 130. The components of system 101 may all reside on a single chip, or one or more of the components may reside on a separate chip, including being located in a different computing device. For example, system 101 includes a processing chip 103 on which processor cores 102*a-d* are electrically connected to shared cache 120 via connections 132. Memory 130 is configured as an external memory that is accessed by chip 103 via connection 134. The connections 132 and 134 may be of the same type or may include different types of connections. For example, connections 132 may be electrical connections, and connection 134 may include an optical connection.

Processor cores 102*a-d* may be configured to perform processing operations for executing one or more workloads, with the processing operations being performed in parallel to one another. These processing operations include performing read and write operations with respect to a memory, and the shared cache 110 may be configured to include memory that is accessible by processor cores 102*a-d* in connection with performing these read and write operations. Shared cache 110 may be further configured to associate stored data within a number of cache ways 112*a-h*, with each way 112*a-h* allowing processor cores 102*a-d* to access data associated with a stored data address. The data stored in each of the ways 112*a-h* may be identified based on a data address tag within each way 112*a-h*. For example, shared cache 110 may be configured as a hardware cache that functions as an N-way set associative cache, and which provides for N blocks within each set. Data mapping to each set within shared cache 110 is accessible by each processor core 102*a-d*.

Shared cache 110 may be configured as a high-speed memory array, such as high-speed static random-access memory (SRAM). The size of the memory array, as well as the number of ways contained within shared cache 110, will determine the data size that is accessible in connection with each way 112*a-h*. While shared cache 110 is shown as having eight ways 112*a-h*, the shared cache may be configured with another number of ways, such as by being configured as a cache of 16 ways or 32 ways. Memory 130 may include a dynamic random-access memory (DRAM) that can store additional data beyond what is accessible within the shared cache 110.

Each cache way 112*a-h* of shared cache 110 can be configured to contain a tag 114 that identifies a data address, and each processor core 102*a-d* may access cached data by transmitting a request for a particular data address to shared cache 110 via connection 132. Shared cache 110 determines whether a particular way 112*a-h* contains a tag corresponding to the particular data address identified within the received transmission. The data corresponding to the particular data address can then be identified and transmitted by shared cache 110 to the processor core 102 that made the request. The data that is stored within shared cache 110 can be accessed numerous times during execution of workloads by processor cores 102*a-d*. If a workload requires data that is not found within shared cache 110, the processor core 102 performing the workload may access this data within memory 130. Memory 130 will often have a much larger storage size than shared cache 110, however accessing data via memory 130 will typically take longer than accessing data via shared cache 110. Accordingly, the data accessed from memory 130 can be placed into shared cache 110 for rapid future access. In this instance, the data that has been accessed from memory 130 is placed into shared cache 110 by replacing some data that is currently stored within shared cache 110.

The data sets that are stored, or are to be stored, within shared cache 110 can be referred to as cache lines. In maintaining and replacing cache lines within shared cache 110, a priority-based least recently used (LRU) replacement policy may be used by shared cache 110. This priority-based LRU replacement policy is an altered form of a standard LRU policy, in that cache lines are placed within a replacement queue based, at least in part, on an identified priority level of the cache line. Under a standard LRU replacement policy, each time a cache line is touched, such as by being subjected to a read or write operation, the cache line will be identified as the most-recently-used (MRU) cache line, and this MRU cache line will be placed at the end of a replacement queue. In accordance with aspects of the disclosure, a priority-based LRU replacement policy may be used in which a cache line within shared cache 110 can be associated with a priority level, and this priority level can be used to determine where the cache line is to be placed within the replacement queue. If a data set for a new cache line is received by shared cache 110, the priority-based LRU replacement policy can be used to identify the existing cache line that is at the front of the replacement queue, and this existing cache line can be designated to be replaced by the new cache line.

The priority level for a cache line can be encoded within a tag for the cache line. For example, ways 112*a-h* each contain a tag 114, which can be encoded with the priority level of the cache line that corresponds to each way 112*a-h*. The identification of the queue position for a touched cache line can be determined based on a fixed function or a lookup table. For example, the priority level for a cache line at way 112*a* can be accessed from the corresponding tag 114, with this priority level serving as an input for a lookup table that will output a replacement queue position in accordance with the priority level input.

Figure 2:
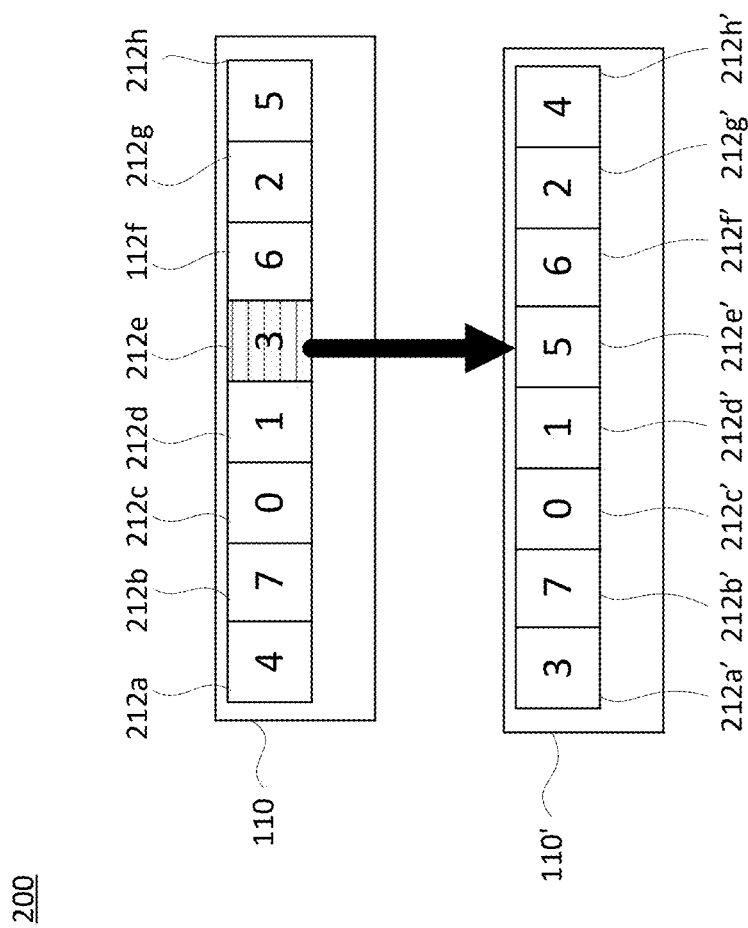
FIG. 2 is a block diagram of a replacement queue for a plurality cache ways in accordance with aspects of the disclosure.

FIG. 2 is a block diagram 200 of a shared cache 110 having eight different ways 212a-h for storing cache lines. Each way 212a-h corresponds to a cache line that has a particular position within the replacement queue. In block diagram 200, the replacement queue for ways 212a-h is represented by numbers '0' to '7', with '0' representing the cache line that is at the front of the replacement queue, and '7' representing the cache line that is at the end of the replacement queue. Accordingly, way 212c is currently designated as being at the front of the replacement queue, and therefore the cache line for way 212c is positioned as the next cache line to be evicted if a new cache line is received by shared cache 110. The next cache line in the replacement queue is located at way 212d, which is then followed by way 212g, and so on, up to way 212b, which is at the end of the replacement queue. Way 212b is therefore currently located at the farthest position from being replaced within the replacement queue of shared cache 110.

Block diagram 200 provides an example in which the cache line for way 212e is subject to a read operation and is repositioned within the replacement queue based on a priority level associated with the cache line. Under a standard LRU replacement policy, the cache line for way 212e would be placed at the end of the replacement queue after it has been accessed or "touched" in connection with the read operation. However, under the altered LRU replacement policy, the cache line for way 212e is repositioned within the replacement queue based on an identified priority level for the cache line. For example, way 212e may be designated with a particular priority level that is lower than the priority level of other cache lines within shared cache 110, and way 212e may be repositioned within the queue so as to remain in front of at least some higher priority cache lines. In particular, way 212e contains a cache line that has been designated with a priority level that is less than the priority level of the cache lines found at ways 112f and 212b. Thus, way 212e is placed at a queue position that is in front of way 212f (queue position '6') and way 212b (queue position '7'). This is shown within the updated shared cache 110', in which way 212e' is now designated as being at a queue position of '5'. In placing way 212e' at queue position '5', the two ways 212a' and 212h' are each decremented within the replacement queue to positions '3' and '4' respectively. Accordingly, way 212e' is repositioned behind ways 212a' and 212h' while remaining in front of ways 212f' and 212b'.

Figure 3:
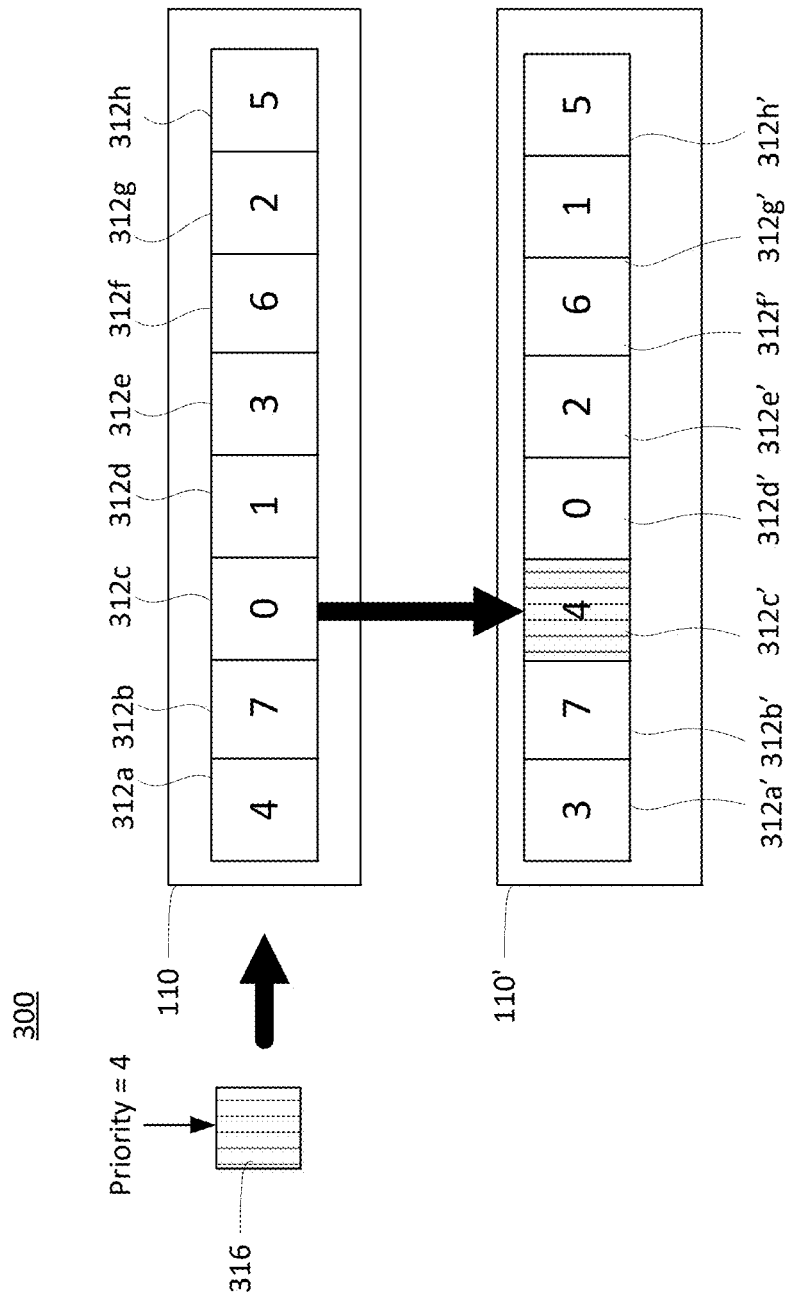
FIG. 3 is a block diagram of a shared cache that has received a data set to be added as a new cache line in accordance with aspects of the disclosure.

In addition to repositioning cache lines within the replacement queue, shared cache 110 is also configured to add new cache lines in accordance with an identified priority level of the new cache line. FIG. 3 is a block diagram 300 of a shared cache 110 that has received a data set that is to be added to shared cache 110 as a new cache line 316. This data set may have been received from an external memory. In adding new cache line 316, shared cache 110 determines which of the existing cache lines is to be replaced. This determination is made based on the designated position of each cache way 312a-h within the replacement queue. In particular, shared cache 110 may identify the way 312a-h that is designated as having the earliest position within the placement queue. In block diagram 300, way 312c is designated with a position '0', indicating that way 312c contains the cache line that is to be evicted and replaced by new cache line 316.

In replacing the previous cache line for way 312c with the new cache line 316, shared cache 110 identifies the priority level of the new cache line 316 and places the new cache line 316 within the replacement queue based on the identified priority. For example, new cache line 316 contains a designation of a priority '4', indicating that it is to be added to the middle of the replacement queue, rather than at the end. Accordingly, new cache line 316 is placed into way 312c with a designated position that is in the middle of the replacement queue. This is shown in the block diagram of shared cache 110', in which way 312c' contains the data for new cache line 316 and is now designated with a replacement queue position of '4'. Thus, despite being the most-recently-used cache line within shared cache 110', the new cache line 316 is positioned ahead of way 312b', way 312f', and way 312h' within the replacement queue. Accordingly, the cache lines for ways 312b', 312f', and 312h' will be maintained for a longer period of time within shared cache 110', in that their higher priority will prevent them from being pushed forward in the replacement queue by lower priority cache lines. However, the ways 312a', 312d', 312e' and 312g' are each moved forward within the replacement queue by each having their queue positions decremented by one position. Thus the cache line for way 312d' becomes the next cache line to be evicted from shared cache 110' when another cache line is received.

The priority level of new cache line 316 can take the form of an absolute priority level that determines its particular position when it is placed within the replacement queue of shared cache 110. Alternatively, the priority level for new cache line 316 may take the form of a relative priority level, in which the placement of the new cache line 316 is based on its relative priority with respect to the other cache lines currently within the replacement queue. For example, within block diagram 300, new cache line 316 can be given an absolute priority level of '4', meaning that the shared cache 110 will place new cache line 316 within the replacement queue at a designated queue position of '4'. A new cache line can be given any priority level that corresponds to any queue position within a shared cache 110, thus the number of priority levels for cache lines can correspond to the number of available ways within a shared cache, with highest priority cache lines receiving a priority level of the last position within the replacement queue. For shared cache 110, the highest priority cache lines will be designated with a priority level of '7'.

New cache lines may alternatively receive a relative priority level that does not designate a particular position within the replacement queue, but which identifies a relative priority with respect to other cache lines within the replacement queue. For example, new cache line 316 may alternatively be given a middle-level priority relative to other cache lines that have been designated with a high-level priority or a low-level priority. When using a replacement policy for cache lines having a relative priority, the shared cache 110 may be configured to start at the end of the replacement queue and determine the latest position within the queue for which the stored cache line does not have a higher priority than the new cache line that is to be added. The shared cache will then designate the new cache line with this position within the replacement queue. For example, if new cache line 316 of FIG. 3 is given a middle-level priority, shared cache 110 may determine that ways 312b, 312f, and 312h each are designated with a high-level priority and that way 312a is the first cache line from the end of the queue that does not have higher than a middle-level priority. Shared cache 110 may therefore position new cache line 316 within the replacement queue at a position of '4' based on the priority of new cache line 316 relative to the other cache lines stored in shared cache 110.

Returning to FIG. 1, shared cache 110 may be configured to limit a new cache line to a particular subset of cache ways 112a-h. For example, a shared cache 110 may lock a particular subset of cache ways 112a-h, so as to prevent the cache lines associated with that subset of cache ways 112a-h from being replaced, or otherwise overwritten. The locking of a particular cache way, such as way 112a may be performed in accordance with one or more system requirements, such as when the cache line for way 112a is currently being accessed or is needed by one of the processor cores 102a-d.

In accordance with another aspect of the disclosure, shared cache 110 may be configured to occasionally place a touched cache line at the end, or toward the end, of the replacement queue, even if the priority level of the touched cache line is relatively low. This may be performed in order to prevent any cache line from remaining untouched at the end of the replacement queue for an extended period of time. For example, a single high priority cache line may remain at the end of the replacement queue if all of the other cache lines within the shared cache 110 are of a lower priority. To prevent this high priority from remaining untouched at the end of the replacement queue, shared cache 110 may occasionally place a lower priority cache line at the end of the replacement queue, rather than always placing the lower priority cache line in front of the higher priority cache line. This type of non-priority placement may be achieved by configuring the shared cache 110 to occasionally override the priority-based placement.

Figure 4:
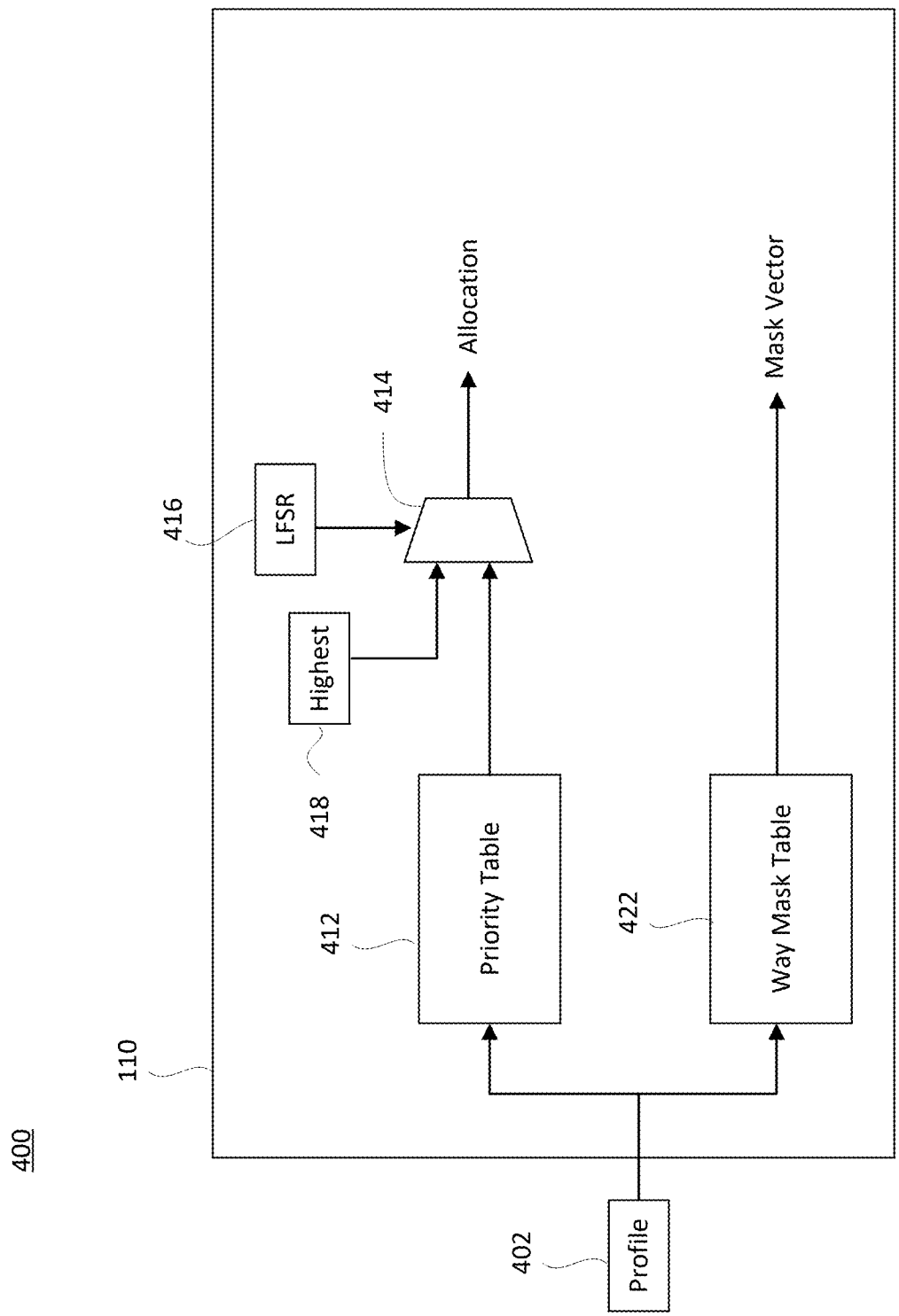
FIG. 4 is a block diagram of a shared cache that is configured to identify placement of a data set within a replacement queue in accordance with aspects of the disclosure.

An example of a shared cache 110 that is configured to override the priority-based placement of a cache line is provided in FIG. 4. As shown in block diagram 400 of FIG. 4, shared cache 110 can include a priority lookup table 412. The priority lookup table 412 can be maintained to identify the priority levels of cache lines that are currently stored within the shared cache 110, as well as the current queue positions of those cache lines. Upon accessing a data set profile 402, shared cache 110 can identify the priority level of the data set and use priority lookup table 412 to determine a priority-based queue position for the data set within the replacement queue. However, a random number generator or a pseudo-random number generator 416, such as a linear-feedback shift register (LFSR), can be used to override the priority-based queue position to place the data set at a position that is independent of the data set's priority level. For example, the selector 414 can use the output of the pseudo-random number generator 416 to determine whether the data set for profile 402 should be allocated a queue position based on the output of priority lookup table 412 or based on some other predetermined allocation value 418. For example, allocation value 418 may be set to correspond with the highest priority level, so that the data set will be placed at the end of the replacement queue.

The data set profile 402 may be a data set that was received from an external memory and is to be added as a new cache line to shared cache 110, or data set profile 402 may be the profile of an existing cache line within shared cache 110 that has been touched in connection with performing a cache operation. In addition, the pseudo-random number generator 416 and selector 414 may be adjustably configurable, so as to adjust how often the priority-based placement of a data set will be overridden. At one extreme, shared cache 110 can be configured in accordance with a first mode of operation in which data sets are always positioned within the replacement queue in accordance with a priority-based placement. The pseudo-random number generator 416 and selector 414 can also be adjusted so as to allow shared cache 110 to operate in another mode of operation that overrides the priority-based placement some predetermined percentage of the time. At the other extreme, pseudo-random number generator 416 and selector 414 can be adjusted so that shared cache 110 always overrides the priority level. Thus, shared cache 110 may have yet another mode of operation in which data sets are positioned within the replacement queue in accordance with a standard LRU replacement policy that is independent of the priority level of the data set.

In addition, shared cache 110 may contain a way mask lookup table 422, which can be configured to maintain a list of ways within the shared cache that are currently locked and are not to be overwritten. The output of way mask lookup table 422 can take the form of a way mask vector that identifies the subset of ways within shared cache 110 that cannot be replaced by the data set profile 402.

Figure 5:
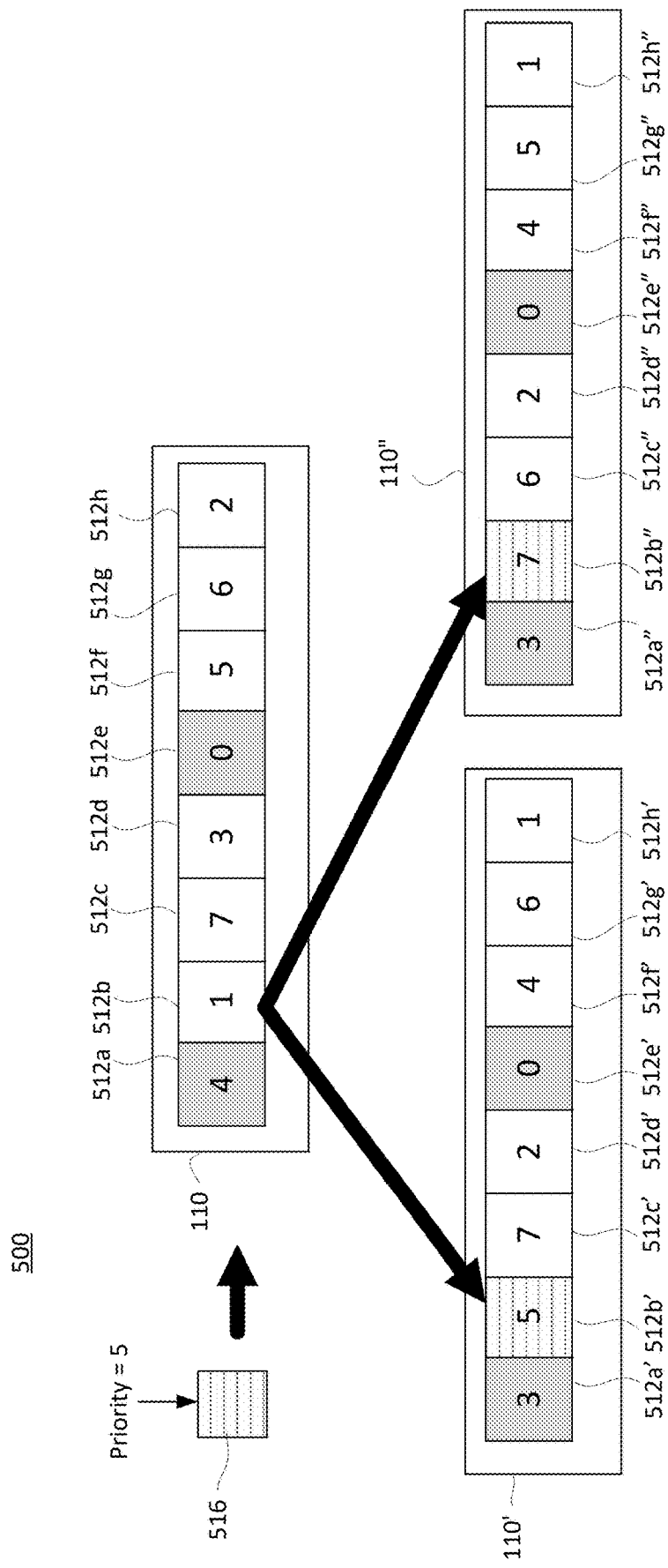
FIG. 5 is a block diagram of a shared cache that is configured to add a data set as a new cache line in accordance with a priority-based placement and in accordance with a placement that is independent of priority level.

FIG. 5 is a block diagram 500 of a replacement queue for shared cache 110 that is configured to allocate a data set within the replacement queue in accordance with the features described in connection with block diagram 400. For example, shared cache 110 may receive a data set that is to be added to shared cache 110 as a new cache line 516. Shared cache 110 may determine if any of the ways 512a-h are currently locked. In block diagram 500, ways 512a and 512e have been masked, so as to prevent new cache line 516 from replacing the locked cache lines located at these two ways. While the cache line for way 512e is designated with a replacement queue position of '0', indicating that it would be the next cache line to be evicted, this cache line cannot be replaced, as it is currently masked. Thus, the cache line for way 512b is identified for eviction, as it is the next cache line within the replacement queue. Thus new cache line 516 is designated to be located at way 512b.

With regard to the queue position for new cache line 516, shared cache 110 may identify that new cache line 516 contains a priority level of '5'. Thus, new cache line 516 may be placed within the middle of the replacement queue at a designated position of '5'. This is shown in way 512b' of shared cache 110'. In addition, all ways 512a'-512h' having a queue position between '2' and '5' are moved forward in the replacement queue by one position. However, as discussed above, shared cache 110 may be configured to occasionally override the priority-based placement of new cache line 516. For example, if a pseudo-random number generator provides an output that has been designated as resulting in an override of the priority-based placement, way 512b may be designated with a queue position that places new cache line 516 at the end of the replacement queue. This can be seen in way 512b" of shared cache 110", which has been designated with a queue position of '7', rather than '5'. Accordingly, ways 512a'-512h' of shared cache 110' represent the queue positions when cache line 516 is added to way 512b' in accordance with it identified priority, while ways 512a"-512h" of shared cache 110" represent an override of the priority-based placement, in that cache line 516 has been added to the end of the replacement queue, in a manner that is independent of its priority level.

Figure 6:
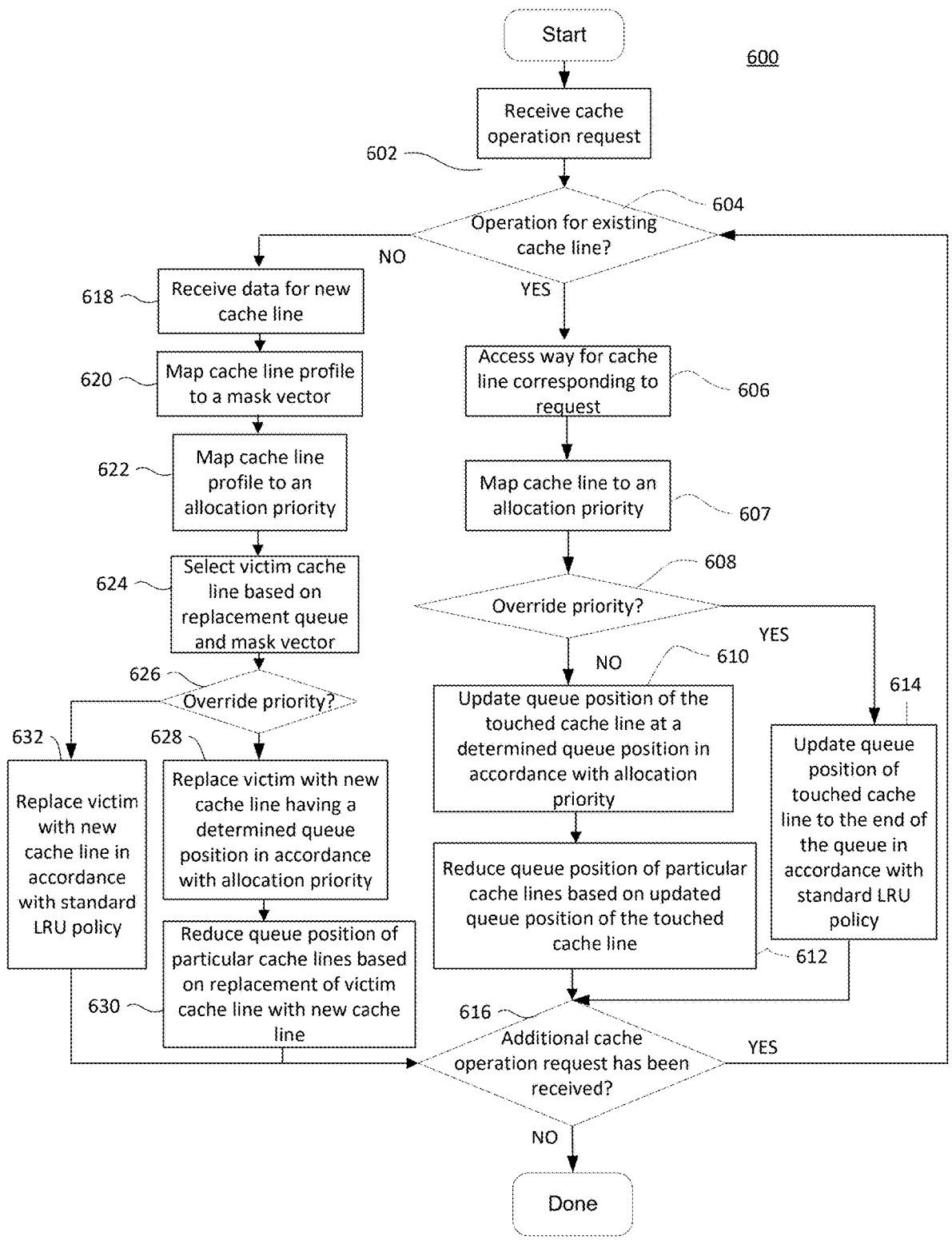
FIG. 6 is a flow diagram in accordance with aspects of the disclosure.

FIG. 6 is a flow diagram 600 in accordance with aspects of the disclosure.

Operations within flow diagram 600 may be performed by one or more components within a system described herein, including a shared cache that is accessible by a plurality of processor cores. Additional operations may be performed in accordance with the disclosure beyond those set forth in flow diagram 600, and some operations in flow diagram 600 may not be skipped in accordance with the disclosure. In addition, while blocks 602-632 are set forth in a particular order, it is understood that some operations may be performed in a different order, or simultaneously, in accordance with aspects of the disclosure.

In block 602, a shared cache may receive a cache operation request. For example, a processor core may transmit to the shared cache a read or write request that identifies a particular data address. The shared cache can identify whether the request identifies data that corresponds to a cache line within the shared cache (block 604). If so, the shared cache can access the way that contains the identified cache line and transmit this cache line in accordance with the request (block 606). The accessed cache line has now been touched, and a determination is to be made as to the position of the touched cache line within the replacement queue of the shared cache. In block 607, the shared cache can access encoded priority level data within the tag for the touched cache line to determine the priority-based queue position for the touched cache line. This could also include accessing a lookup table that identifies the priority-based queue position for the touched cache line. In block 608, it is determined whether the touched cache line is to be placed in accordance with its priority level, or whether this priority-based placement is to be overridden.

If the priority-based placement is not overridden, the replacement queue implements an altered LRU replacement policy and the queue is updated so as to position the touched cache line at a determined queue position that is based on the priority level of the touched cache line. As described herein, the priority level of the touched cache line may be an absolute priority level that identifies a particular queue position, or the identified priority may be a relative priority level with respect to other cache lines within the replacement queue. In either instance, the touched cache line may be placed within the replacement queue at a position that is in front of higher priority cache lines located at the end of the replacement queue. In block 612, the queue positions of other cache lines are updated based on the new queue position of the touched cache line. For example, if the touched cache line is moved from a first position to a second position, all cache lines having a queue position greater than the first position, but not greater than the second position will be decremented by one position within the replacement queue. At block 616, a determination may be made whether an additional cache operation request has been received. If so, shared cache can be determined whether the additional request identifies an existing cache line (block 604), and operations can be performed in connection with the additional cache operation request.

Returning to block 608, if the priority-based replacement policy is to be overridden, shared cache 614 can update the queue position of the touched cache line in accordance with a standard LRU policy, whereby the touched cache line is placed at the end of the queue. Returning to block 604, if the shared cache does not identify an existing cache line in connection with the requested operation, the shared cache can receive the data for the requested operation from another memory (block 618). The received data can be added to the shared cache as a new cache line. In block 620, a mask vector is generated to prevent the new cache line from being placed into a way that has been locked, so as to prevent the data for that way from being overwritten or otherwise replaced. In block 622, the shared cache can access encoded priority level data within a tag for the new cache line to determine the priority-based queue position for the new cache line. This can include accessing a lookup table that identifies the priority-based queue position for the new cache line. A victim cache line can be selected for eviction based on the replacement queue of the shared cache, as well as based on the mask vector that has locked particular ways from being replaced (block 624).

In block 626, it is determined whether the touched cache line is to be placed in accordance with its priority level, or whether this priority-based placement is to be overridden. If the priority-based placement is not overridden, the new cache line will replace the selected victim cache line by being placed at a queue position in accordance with its identified priority level (block 628). The queue positions of other cache lines are also updated based on the new queue position of the touched cache line (block 630). For example, the queue position of each cache line can be decreased by one, provided that the cache line is greater than the queue position of the victim cache line queue position, but not greater than the queue position of the new cache line.

Returning to block 626, if the priority-based placement is to be overridden, the selected victim cache line can be replaced by the new cache line in accordance with a standard LRU policy, in which the cache line queue positions will be updated so as to put the new cache line at the end of the replacement queue (Block 632).

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples. Further, the same reference numbers in different drawings can identify the same or similar elements.

The invention claimed is:

1. A system for maintaining a data cache comprising:
one or more processors configured to execute in parallel a plurality of workloads;
a shared cache that is accessible for operations associated with the plurality of workloads, the shared cache containing a plurality of cache lines configured for storing cached data, wherein each cache line is associated with one of a plurality of priority levels; and
wherein the shared cache is configured to place a touched cache line currently within the shared cache within an altered least-recently-used (LRU) queue based on an identified priority of the touched cache line.

2. The system of claim 1, wherein the plurality of cache lines are associated with priority levels based on being associated with particular workloads from the plurality of workloads.

3. The system of claim 2, wherein the one or more processors comprise a plurality of processor cores configured to access the shared cache while executing the plurality of workloads in parallel.

4. The system of claim 1, wherein the touched cache line is placed in front of one or more other cache lines within the altered LRU queue based on the identified priority being less than the priority levels of the one or more other cache lines.

5. The system of claim 1, wherein the one or more processors are further configured to receive data for a new cache line to be added to the shared cache at a priority-based queue position, and wherein the shared cache is further configured to identify an existing cache line to be replaced by the new cache line based on the existing cache line being designated with a queue position for eviction.

6. The system of claim 1, further comprising a lookup table configured to identify a queue position for the touched cache line based on the identified priority of the touched cache line.

7. The system of claim 1, wherein the shared cache is configured to place a plurality of touched cache lines within the altered LRU queue, and wherein a first subset of the touched cache lines are placed within the altered LRU queue based on identified priorities of the touched cache lines and a second subset are not placed in the altered LRU queue based on identified priorities.

8. The system of claim 7, wherein the second subset of touched cache lines are placed at the end of the altered LRU queue based on an output of a random number generator or a pseudo-random number generator.

9. The system of claim 1, wherein the shared cache is further configured to prevent one or more cache lines from the plurality of cache lines from being replaced in connection with adding new cache lines to the shared cache.

10. The system of claim 1, wherein the shared cache is a static random-access memory (SRAM).

11. A method for maintaining a data cache comprising:
storing data within a plurality of cache lines of a shared cache, wherein the shared cache is configured to be accessible in connection with executing a plurality of parallel workloads;
receiving, by the shared cache, a request in connection with one of the plurality of parallel workloads;
accessing a data set within the shared cache in connection with the request;
determining a priority level of the data set;
placing the data set in an altered least-recently-used (LRU) queue within the shared cache based on the priority level of the data set.

12. The method of claim 11, wherein the priority level of the data set is based on a type of workload that has performed operations in connection with the data set.

13. The method of claim 12, further comprising receiving a plurality of requests from a plurality of processor cores in connection with executing the plurality of parallel workloads.

14. The method of claim 11, further comprising placing the data set within the altered LRU queue in front of one or more stored cache lines based on the priority level of the data set being less than priority levels of the one or more stored cache lines.

15. The method of claim 11, further comprising receiving a new data set is to be added to the shared cache, and further comprising:
identifying an existing cache line to be replaced by the new data set based on the existing cache line being designated with a queue position for eviction; and
adding the new data set as a new cache line at a priority-based queue position within the altered LRU queue.

16. The method of claim 11, further comprising accessing a lookup table configured to identify a queue position for the data set based on the identified priority of the data set.

17. The method of claim 11, further comprising placing a first subset of data within the altered LRU queue based on identified priority levels of the first subset of data and placing a second subset of data within the altered LRU queue independent of priority levels.

18. The method of claim 17, wherein the second subset of data is placed at the end of the altered LRU queue based on an output of a random number generator or a pseudo-random number generator.

19. The method of claim 11, further comprising identifying one or more cache lines from the plurality of cache lines as being locked from being replaced by the data set.

20. The method of claim 11, wherein storing data within a plurality of cache lines of a shared cache comprises storing data within a static random-access memory (SRAM).

* * * * *